(12) United States Patent
Keohane et al.

(10) Patent No.: US 7,746,988 B2
(45) Date of Patent: Jun. 29, 2010

(54) METHOD, SYSTEM AND TELEPHONE ANSWERING DEVICE FOR PROCESSING CONTROL SCRIPTS ATTACHED TO VOICE MESSAGES

(75) Inventors: Susan Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1784 days.

(21) Appl. No.: 10/865,698

(22) Filed: Jun. 10, 2004

(65) Prior Publication Data

US 2005/0276393 A1 Dec. 15, 2005

(51) Int. Cl.
*H04M 11/00* (2006.01)
*H04M 1/64* (2006.01)
*H04M 11/10* (2006.01)
(52) U.S. Cl. .................. 379/88.13; 379/88.19; 455/413
(58) Field of Classification Search ................ 379/67.1, 379/69, 88.13; 455/413
See application file for complete search history.

(56) References Cited

U.S. PATENT DOCUMENTS

| 5,524,140 A | * | 6/1996 | Klausner et al. ......... 379/88.11 |
| 5,610,973 A | * | 3/1997 | Comer ........................ 455/413 |
| 5,737,725 A | * | 4/1998 | Case ........................... 704/260 |
| 5,950,123 A | * | 9/1999 | Schwelb et al. .......... 455/414.4 |
| 6,052,442 A | * | 4/2000 | Cooper et al. ............. 379/88.19 |
| 6,385,202 B1 | * | 5/2002 | Katseff et al. ................ 370/401 |
| 7,103,566 B2 | * | 9/2006 | Silva et al. ..................... 705/26 |
| 7,433,954 B2 | * | 10/2008 | Dolinar et al. .............. 709/226 |
| 2002/0141550 A1 | * | 10/2002 | Ivory ........................ 379/88.17 |
| 2005/0232402 A1 | * | 10/2005 | Greve ....................... 379/88.22 |
| 2006/0120343 A1 | * | 6/2006 | O'Brien et al. ............. 370/351 |

* cited by examiner

*Primary Examiner*—Curtis Kuntz
*Assistant Examiner*—Joseph T Phan
(74) *Attorney, Agent, or Firm*—Mitch Harris, Atty at Law, LLC; Andrew M. Harris; Diana R. Gerhardt

(57) ABSTRACT

A method, system and telephone answering device for processing control scripts attached to voice messages provides a mechanism by which a caller can leave an interactive list of contact information. The scripts provide for control of a display and input responses from a keypad or other input device so that an entry on the contact information list can be activated in response to user input, thus returning the call. The list information displayed may be arbitrary textual associations with the underlying contact number. The contact information may also include e-mail addresses, so that activation of an e-mail list element will activate a text messaging service, if available. For wireless telephone devices, the method implementing the present invention may be operable at the service provider only, so that standard wireless telephones may be programmed to provide the interactive list from a provider-side interpretation of the scripts.

18 Claims, 3 Drawing Sheets

METHOD, SYSTEM AND TELEPHONE ANSWERING DEVICE FOR PROCESSING CONTROL SCRIPTS ATTACHED TO VOICE MESSAGES

BACKGROUND OF THE INVENTION

1. Field of the Invention

The present invention is related to telephone communication systems and devices, and more particularly a wired or wireless telephone system that provides an interactive interface based on a script attached to a voice message.

2. Description of Related Art

In general, all present wired and wireless telephones provide voice mail capability, either by implementing a voice mail service at the provider-side, or by including message recording capability in the telephone, a telephone line accessory, or at a private telephone service exchange (PBX).

When leaving a message for a party who is unavailable, it would be convenient to leave multiple contact options (multiple telephone numbers, e-mail addresses pager numbers, etc.). However, it is inconvenient for both the caller and the recipient to leave multiple numbers, and the possibility that the message will be erased before the numbers are copied to hard form or that the copied numbers will be lost before the recipient can return the call makes it desirable to provide a mechanism by which the contact information can be transmitted in an error free- and persistent manner.

While existing caller identification services can provide callback information for the number that connected to the voice mail service or answering machine, the calling number is often not the desired callback information. Further, caller identification services do not provide a solution for providing multiple contact numbers.

Existing wireless telephones provide a screen and directory format that provide lists of telephone numbers for call logs and directories, but those lists are controlled by the service provider not a caller and when the lists represent caller contact information, they are typically only lists of individual numbers each associated with a unique voice message or completed call.

Therefore, it would be desirable to provide a method and system and telephone answering device for providing a list of contact information in conjunction with a voice message left on the telephone device or at the voice mail provider. It would further be desirable to provide such a method, system and telephone device that can automatically respond the voice message when the recipient interacts with the provided list.

SUMMARY OF THE INVENTION

The above objectives of providing an interactive contact list attached to a voice message are achieved in a method, system and telephone answering device. The method, system and telephone answering device transmit and receive scripts that are attached to a voice message, so that a menu list of contact information can be presented with each voice message without a need to verbally render the list.

The script is a set of macro instructions for generating a visual display of the list and assigning keypad responses to each member of the list, so that when the recipient of the voice message and script presses a key associated with a member of the list, a call can be returned (dialed) automatically by activating a response portion of the script. The list of contact information is independent of the contact information entries (e.g., telephone numbers), and thus may comprise descriptive text indications rather than the contact information entries themselves. In addition, e-mail addresses may be included in the list, which may only be informative, or may activate a text-messaging feature for automatic (one-button) response.

For wireless telephones, the method may be embodied in a wireless network control system computer executing program instructions for carrying out the steps of the method and may further be embodied in a computer program product containing program instructions in computer-readable form for carrying out the steps of the method. As such, the system may interact with standard wireless telephones that do not process the scripts directly, but have displays and input devices that are writable/readable directly by the network control system computer.

For standard wired (analog) telephone systems, a telephone or answering machine are provided with a display and input device (which may be the telephone keyboard and/or caller ID display) that are controlled by a microcontroller that interprets scripts attached to the voice message. For PBX systems, the display and keypads associated with each handset are used to provide the interactive list display and the scripts may be processed by the PBX control computer, which controls the handset display and reads user input from the keypads.

The foregoing and other objectives, features, and advantages of the invention will be apparent from the following, more particular, description of the preferred embodiment of the invention, as illustrated in the accompanying drawings.

DETAILED DESCRIPTION OF PREFERRED EMBODIMENT

The present invention concerns an added feature to existing voice mail systems: the addition of a user interface generated by a caller-provided script that can be activated by a recipient of a voice mail message provided by the caller. The systems in which the present invention applies extend to wireless and wired telephonic devices that are operated in conjunction with a voice mail system and/or service provider. The present invention implements a service that can be marketed by a service provider in order to enhance voice mail capabilities by providing a mechanism by which a caller may provide multiple response options (contact points) by which the caller or others may be reached. The contact points generally include telephone numbers and text messaging (e-mail or IM) addresses. However, the user interface generated by activation of the script may include textual or other aliases that are used to indicate to the recipient who the contact associated with an input option (generally a press on the keypad of the telephone or other device). Further the present invention also provides an alternative for non-enhanced equipment that upon detecting that the receiving unit is not compatible with the service, renders an audio option interface. The features of the present invention will now be more specifically described in conjunction with illustrations in the figures.

Figure 1:
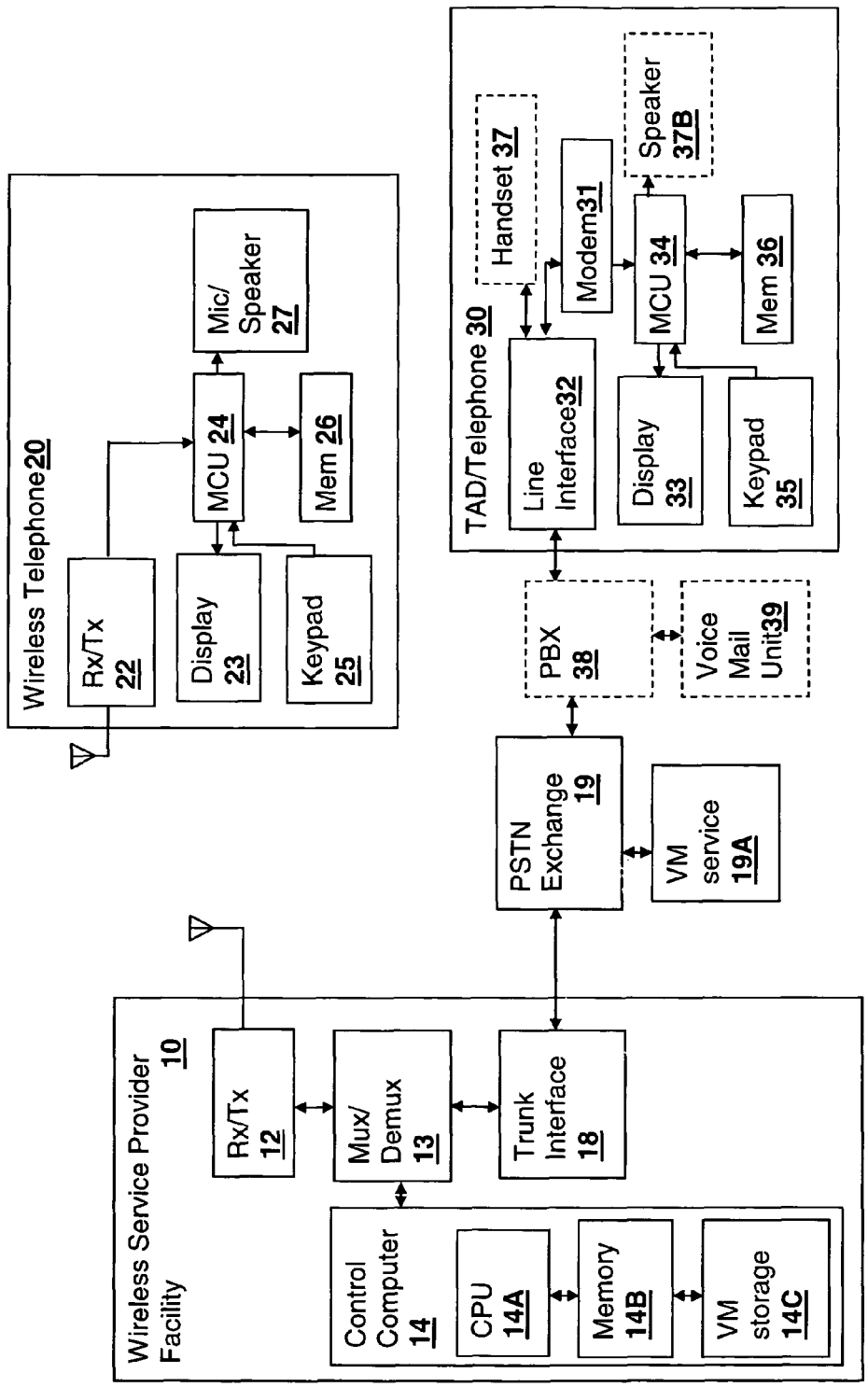
FIG. 1 is a block diagram of a telephone system in accordance with an embodiment of the present invention.

Referring to the figures, and particularly to FIG. 1, a telephone system in accordance with an embodiment of the invention is depicted. A wireless server provider facility 10 includes a transmit/receive unit 12 coupled to a multiplexer/ demultiplexer 13 and a control computer 14 having a central processing unit (CPU) 14A coupled to a memory 14B in which are stored program instructions for carrying out steps of a method illustrated herein below in accordance with an embodiment of the invention. Memory 14B is coupled to a voice message storage 14C from which voice messages and scripts are retrieved after being stored.

Multiplexer/Demultiplexer 13 is also coupled to a trunk interface 18 that connects wireless service provider facility 10 to a public switched telephone network (PSTN) exchange 19 for providing connection to non-wireless telephone equipment and other providers. A voice messaging service 19A is shown connected to PSTN exchange 19 and includes script processing capabilities similar to that described below for wireless service provider facility 10.

A wireless telephone 20 is shown coupled to wireless service provider facility 10 and includes a transmit/receive unit 22 coupled to a microcontroller unit (MCU) 24 for operating wireless telephone 20 in conjunction with wireless service provider facility 10, providing a voice channel via microphone/speaker interface 27. MCU 24 is coupled to a display 23 on which a user interface in accordance with an embodiment of the invention is displayed and operated in conjunction with a keypad 25. MCU 24 is also coupled to a memory 26 that stores program instructions for operating wireless telephone 20 in accordance with an embodiment of the invention. However, the present invention may be used with standard wireless telephones that do not require special program instructions other than providing for control of display 23 and receipt of keypad 25 activity at wireless service provider facility 10. Thus program instructions embodying methods in accordance with the present invention may be present in wireless service provider facility 10 memory 14B and/or wireless telephone 20 memory 26. Although it is possible to practice the present invention entirely from connected devices such as wireless telephone 20, as long as special programming is present within the connected devices, it is desirable to provide the methods of the present invention as a service, which will also increase compatibility between various systems as will be illustrated in detail below.

Finally, the system depicted in FIG. 1 further includes a telephone answering device (TAD) or telephone 30 coupled to the system via PSTN exchange 19 and may be optionally coupled through a private branch exchange (PBX) 38 that includes its own voice mail unit 39. TAD/telephone 30 optionally includes a handset 37 (which is the primary feature distinguishing TAD from telephone) and a line interface 32 for interfacing TAD/Telephone 30 to PSTN exchange 19. Line interface 32 may be a digital proprietary interface if PBX 38 is present, making TAD/telephone a digital PBX extension. Line interface 32 is coupled to MCU 34 via a modem 31 that is used to decode scripts attached to a voice message and also transmit scripts that are input on TAD/telephone 30 for sending to another recipient. Scripts on any device may be entered via an interactive user interface, or retrieved from storage on the device or voice messaging provider. Received scripts may also be stored for forwarding or later retrieval. Line interface 32 is also directly coupled to MCU 34 for recording messages and MCU 34 is coupled to a speaker 37B, in implementations in which TAD/telephone 30 provides voice mail (message recording and playback) capability directly. TAD/Telephone 30, thus may be the voice mail provider, or may only provide the user interface for scripts delivered from a service provider connected via PSTN exchange 19 or provided by PBX 38 in conjunction with its voice mail unit 39.

While the above-described system illustrates both wireless and wired PSTN analog connections and PBX connections, it should be understood that the principles of the present invention apply to other connection technologies such as digital telephones including Integrated Services Digital Network (ISDN) telephone services and fiber distributed data interface voice extension (FDDI-2) services and are therefore contemplated for use with the present invention.

Figure 2:
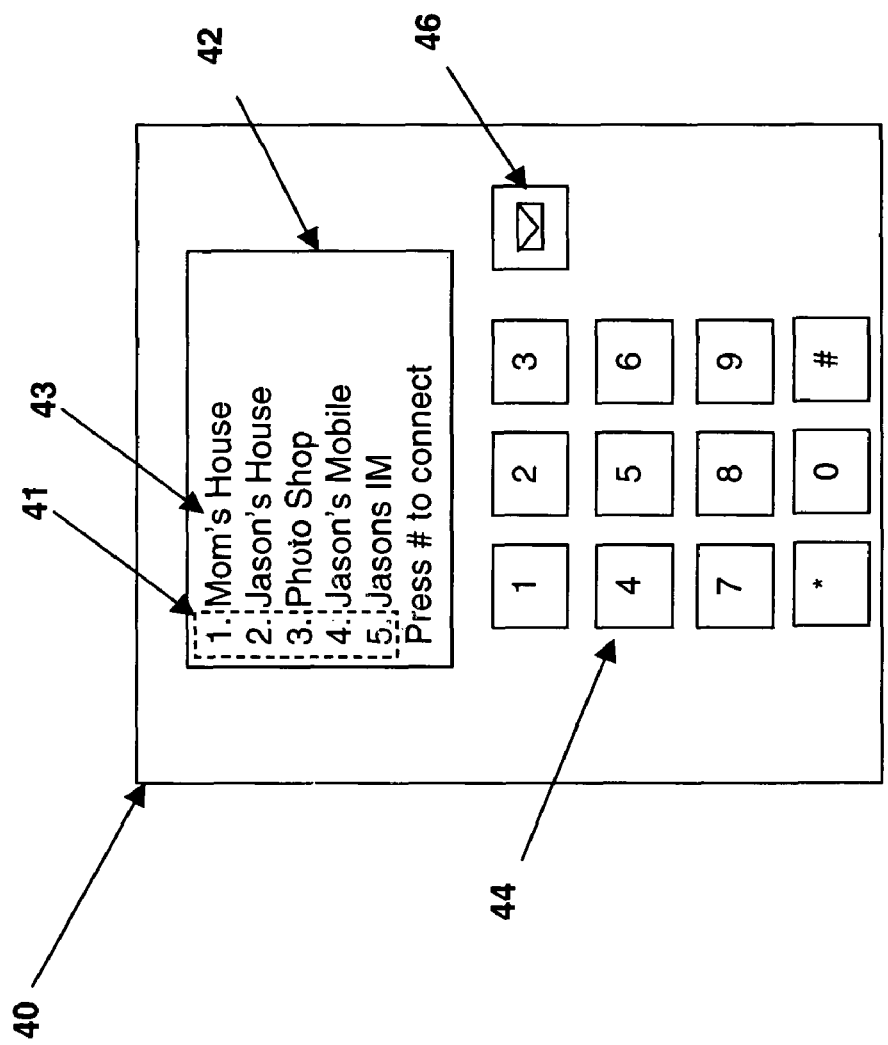
FIG. 2 is a pictorial diagram of a user interface in accordance with an embodiment of the present invention.

Referring now to FIG. 2, a user interface 40 in accordance with an embodiment of the present invention, as may be implemented on display 23 and keypad 25 of wireless telephone 20, as well as on display 33 and keypad 35 of TAD/Telephone 30. A display portion 42 of user interface 40 includes a list of contact identifiers that include ordinals 41 indicating a key association in a keypad 44 or other device forming input portion of user interface 40. By selecting a key of keypad 44 while display 42 is indicating a list a contact mechanism (such as a telephone call, text messaging or internet messaging) is activated in order to respond to the voice message to which the script was attached that caused generation of display portion 42. Voice messages may be retrieved by use of a retrieve voice mail button 46 such as are generally present on wireless telephones and TADs (often a "PLAY" button), or a voice message may be retrieved by dialing a service via keypad 44, which may be a PSTN telephone number or an extension on PBX exchange 19.

Associated with each ordinal 41 in the contact list is a text identifier 43 (that could optionally include or be replaced by graphical elements). The text identifier may in the simplest case be the contact entry information (e.g., telephone number or e-mail address). However, as shown, the text identifier may be arbitrary text associated with the contact information entries and the contact information entries may or may not be displayed in conjunction with the text. Thus a script will generally have two data elements per entry in the list: a text descriptor and a contact information entry. Scripts may be coded as some binary proprietary code, or may be simply a set of delimited ASCII strings such as "Mom's House", "5125551212", "Jason's House", "5125551234, and so forth (comma-delimited in the example). The ordinals may be included, but are not necessary for parsing a script, as the processor generating the user interface can generate any association between the list elements and keypad 44 or other input device.

Compatibility between various units is supplied through a variety of techniques, in accordance with the methods of the present invention. Analog telephone compatibility is provided either through use of an analog telephone or TAD that includes a modem for interpreting and encoding scripts that provide the user interface. For example, referring back to FIG. 1, if wireless service provider facility 10 provides a voice mail message from memory 14B to an analog TAD/Telephone 20, a modernized transmission of the attached script is provided in the transmission of the voice mail message. The script is removed by modem 31 and is supplied to MCU 34, which provides the user interface via display 33 and keypad 35. For scripts provided by TAD/Telephone 30 to wireless service provider facility 10, the process is essentially reversed, with modem 31 encoding a script that was designed or stored on TAD/Telephone 30. Wireless service provider facility 10 will then generate the appropriate digital control signals if the voice message (with script) is retrieved from wireless telephone 20 or other device compatible with digital control signals supplied by wireless service provider facility 10.

When analog devices are used in communication with each other, or in conjunction with a voice mail service available on PSTN exchange 19, then the scripts are both transmitted and received using modernized transmissions. Pure digital communication of an attached script is implemented when devices such as wireless telephone 20 are used for both transmission and reception of a voice message with an attached script.

Figure 3:
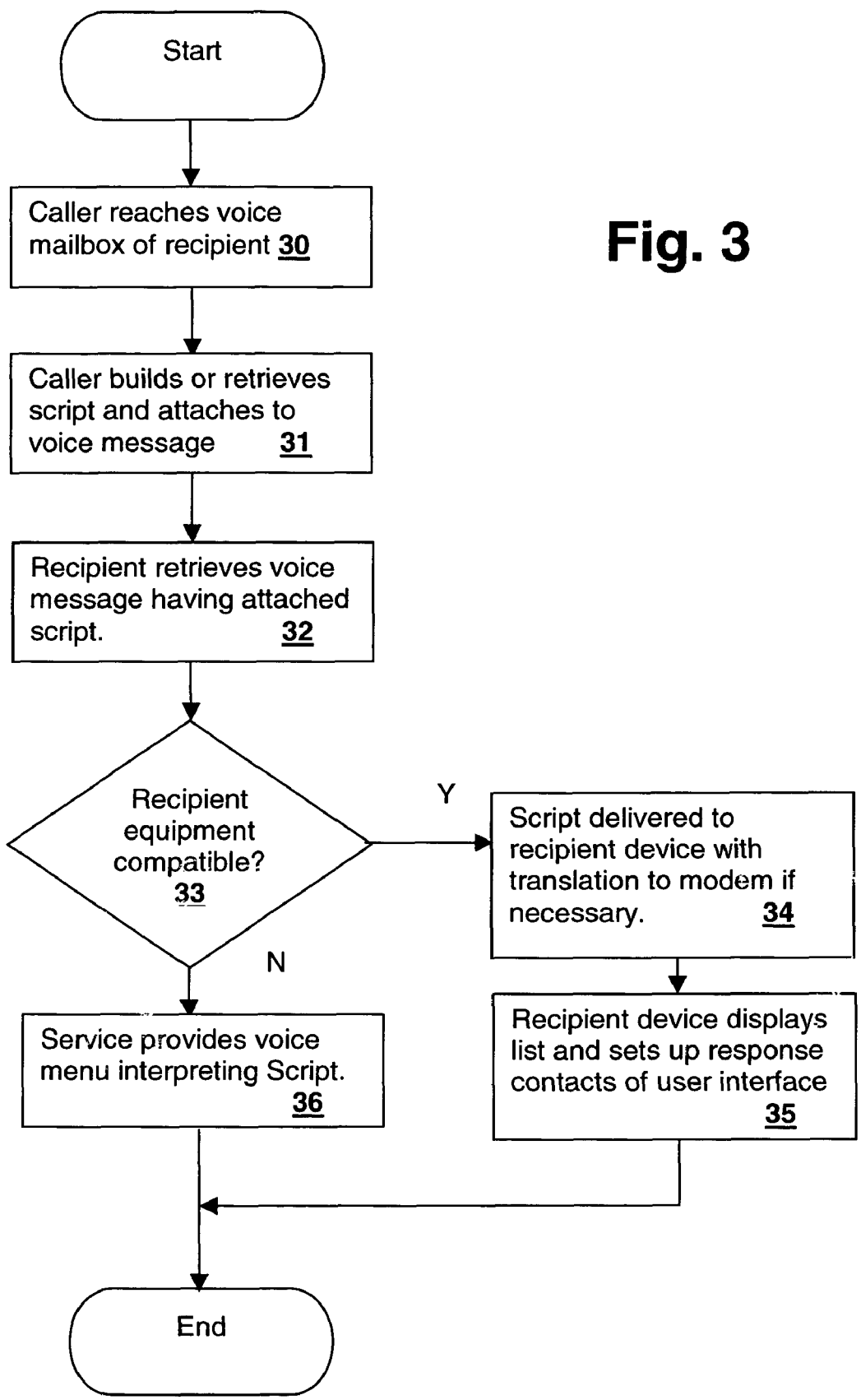
FIG. 3 is a flow chart of a method in accordance with an embodiment of the present invention.

Referring now to FIG. 3, a method in accordance with an embodiment of the present invention is depicted. A caller reaches the voice mailbox of a recipient (step 30) and either builds a new script or retrieves a previously-stored script for attachment to a voice message (step 31). When the recipient retrieves the voice message (step 32), if the recipient equipment is compatible with the script (decision 33), then the script is delivered to the recipient device (step 34) (or interpreted at a wireless service provider that provides direct control of the user interface display and input device). If necessary, the script is modernized and delivered to analog equipment at this step. Next, the recipient device displays the list of contact entries and sets up the response contacts of the user interface (step 35), which initiates contact if the user selects one of the options. If the recipient equipment was determined not to be compatible with the script (decision 33), an alternative voice menu interpreting the script is played back on the recipient device (step 36). The alternative voice menu is generally of the form of a verbal message (following the example of FIG. 2): "To reach Mom's house, press one <pause> To reach Jason's house press two <pause>", and so forth until the contact list is exhausted.

Thus, the present invention provides a mechanism for providing a caller-generated user interface on a device used by the recipient of a voice message, so that response options can be quickly, accurately and persistently provided to the recipient of the message. Compatibility between enabled equipment is provided via modem translation and compatibility with non-enabled equipment is also provided via the alternative voice menu.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for providing a caller-generated interactive multiple contact identifier list to a recipient of a voice message, the method comprising:
    generating, at a caller equipment, a voice message with an attached script for generating said multiple contact identifier list, wherein the attached script contains data elements encoding multiple contact identifiers;
    sending the voice message and said attached script from said caller equipment to a recipient equipment;
    receiving a voice message from said caller equipment, said voice message including said attached script;
    decoding said attached script to extract said multiple contact identifiers and determine associated contact information entries;
    displaying a list of said contact identifiers on a display of said recipient equipment;
    associating each of said contact identifiers with a user input option;
    receiving a user input from said recipient of said voice message, said user input indicating selection of a particular one of said contact identifiers; and
    activating a service with a particular contact information entry associated with said particular contact identifier, whereby said voice message is responded to by said recipient of said voice message.

2. The method of claim 1, wherein said contact information entries comprise telephone numbers, and wherein said activating comprises dialing a particular telephone number.

3. The method of claim 1, wherein said contact information entries comprise e-mail addresses, and wherein said activating comprises activating a text messaging service.

4. The method of claim 1, wherein said contact identifiers comprise pronouns and names of contact entities, whereby said recipient may select said particular contact information entry by association with an identity of a particular contact.

5. The method of claim 1, wherein said contact identifiers are said contact information entries, whereby said displaying displays a list of said contact information entries.

6. The method of claim 1, wherein said receiving records said voice message and receives said attached script at a service provider, and further comprising transmitting said voice message and said attached script to a user telephone device in response to said recipient retrieving said voice message from said service provider.

7. The method of claim 1, wherein said receiving records said voice message and receives said attached script at a service provider, wherein said decoding decodes said attached script at said service provider, and further comprising transmitting said voice message, said contact information entries and said contact identifiers to a user telephone device in response to said recipient retrieving said voice message from said service provider.

8. The method of claim 1, wherein the generating comprises building said attached script on a user interface of the caller equipment.

9. The method of claim 1, further comprising retrieving said attached script from storage of the caller equipment, whereby said script may be attached to said voice message.

10. A telephone system that provides a caller-generated interactive multiple contact identifier list to a recipient of a voice message, comprising at least one processor for executing program instructions and at least one corresponding memory for executing the program instructions and including a recipient equipment and a caller equipment, wherein the program instructions comprise program instructions for:
    receiving from the caller equipment, a voice message with an attached script for generating the multiple contact identifier list, wherein the attached script contains data elements encoding multiple contact identifiers;
    sending the voice message and the attached script from the caller equipment to the recipient equipment;
    receiving a voice message from the caller equipment, the voice message including the attached script;
    decoding the attached script to extract the multiple contact identifiers and determine associated contact information entries;
    displaying a list of the contact identifiers on a display of the recipient equipment;
    associating each of said contact identifiers with a user input option;
    receiving a user input from the recipient equipment that indicates selection of a particular one of the contact identifiers; and
    activating a service with a particular contact information entry associated with the particular contact identifier, whereby the voice message is responded to by a recipient of the voice message.

11. The system of claim 10, wherein the contact information entries comprise telephone numbers, and wherein the activating comprises dialing a particular telephone number.

12. The system of claim 10, wherein the contact information entries comprise e-mail addresses, and wherein the activating comprises activating a text messaging service.

13. The system of claim 10, wherein the contact identifiers comprise pronouns and names of contact entities, whereby the recipient may select the particular contact information entry by association with an identity of a particular contact.

14. The system of claim 10, wherein the contact identifiers are the contact information entries, whereby the displaying displays a list of the contact information entries.

15. The system of claim 10, wherein the program instructions for receiving record the voice message and receive the attached script at a service provider, and further comprising program instructions for transmitting the voice message and the attached script to a user telephone device in response to the recipient retrieving the voice message from the service provider.

16. The system of claim 10, wherein the program instructions for receiving record the voice message and receive the attached script at a service provider, wherein said decoding decodes the attached script at the service provider, and further comprising program instructions for transmitting the voice message, the contact information entries and the contact identifiers to a user telephone device in response to the recipient retrieving the voice message from the service provider.

17. The system of claim 10, wherein the program instructions for generating comprise program instructions for building the attached script on a user interface of the caller equipment.

18. The system of claim 10, further comprising program instructions for retrieving the attached script from a storage of the caller equipment, whereby the script may be attached to the voice message.

* * * * *